Patented May 3, 1932

1,856,187

UNITED STATES PATENT OFFICE

ERLING JOHNSON, OF ODDA, NORWAY, ASSIGNOR TO FIRM: ODDA SMELTEVERK A/S., OF ODDA, NORWAY

PROCESS OF PRODUCING CALCIUM NITRATE AND AMMONIUM SALTS FROM PHOSPHATE ROCK AND LIKE PHOSPHATE MATERIAL

No Drawing. Application filed May 27, 1930, Serial No. 456,302, and in Norway May 30, 1929.

In my pending patent application Ser. No. 391,506 a process is described in which phosphate material such as phosphate rock is dissolved in nitric acid and from this solution calcium nitrate is crystallized out and separated from the resulting mother liquor. The latter contains the entire phosphoric acid of the initial phosphate material together with more or less calcium nitrate and nitric acid. The mother liquor may for instance contain:

21 per cent $P_2O_5$ as free phosphoric acid
7 per cent CaO
3.5 per cent N. } as calcium nitrate.

As pointed out in the said patent application Ser. No. 391,506 the composition of the mother liquor may however be modified within rather wide limits according to its further utilization and according to the products which are to be produced from the mother liquor.

In my patent applications Ser. Nos. 391,506 and 391,507 I have described some methods for working up said mother liquor by precipitating its content of lime by sulphuric acid, ammonium sulphate and the like or by neutralizing the mother liquor with ammonia, ammonium carbonate, alkali carbonates etc.

The present invention relates to a process for production of ammonium phosphate or ammonium phosphate and ammonium nitrate from said mother liquor. For this purpose the mother liquor is treated with ammonia or ammonium carbonate, which precipitates tri-calcium phosphate or a mixture of tri-calcium phosphate and di-calcium phosphate from the liquor and yields a solution of the said ammonium salts. The precipitated phosphates are filtered off and are again dissolved in nitric acid together with a fresh portion of phosphate rock. The solution so obtained is in due course subjected to crystallization of calcium nitrate, and the new mother liquor is treated with ammonia or ammonium carbonate as described above. It is obvious that our process makes it possible to obtain the entire content of lime in the phosphate rock as crystallized calcium nitrate and the entire content of phosphoric acid as ammonium phosphate.

Some examples may illustrate the new process.

Example 1

Phosphate rock is dissolved in nitric acid as described in patent application Ser. No. 391,506. The solution is cooled, and calcium nitrate is crystallized out as $Ca(NO_3)_2 \cdot 4H_2O$ and is separated from the mother liquor.

The following reactions take place:

(1) Dissolving the phosphate:

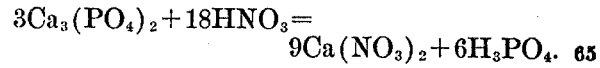
$$3Ca_3(PO_4)_2 + 18HNO_3 = 9Ca(NO_3)_2 + 6H_3PO_4.$$

(2) Crystallization of calcium nitrate:

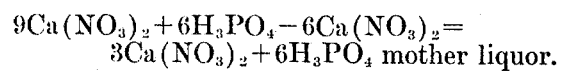
$$9Ca(NO_3)_2 + 6H_3PO_4 - 6Ca(NO_3)_2 = 3Ca(NO_3)_2 + 6H_3PO_4 \text{ mother liquor.}$$

(3) Treatment of the mother liquor with ammonia:

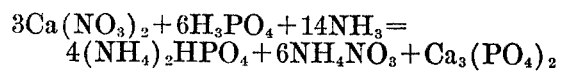
$$3Ca(NO_3)_2 + 6H_3PO_4 + 14NH_3 = 4(NH_4)_2HPO_4 + 6NH_4NO_3 + Ca_3(PO_4)_2$$

When a sufficient quantity of ammonia is used tri-calcium phosphate precipitates. It is filtered off, and a solution containing 6 mol ammonium nitrate to 4 mol ammonium phosphate is left.

Upon evaporation of the solution a product containing some 27 per cent N and 28 per cent $P_2O_5$ (water-soluble) is obtained. If potassium salts are added before or after evaporation the product obtained will represent a concentrated three componental fertilizer.

The precipitated tri-phosphate is filtered off and is again subjected to treatment with nitric acid according to reaction (1) together with a fresh portion of phosphate rock. It is easily seen that in this case for each mol of tri-phosphate returned two mol tri-phosphate as phosphate rock are entering the process.

It is however understood that the quantity of tri-phosphate returned will vary considerably according to the more or less complete crystallization of calcium nitrate from the initial solution. And likewise the composition of the solution of ammonium phosphate and ammonium nitrate may be modified within wide limits as to the relative ratio of phosphoric acid and nitrogen.

*Example 2*

Instead of precipitating the rest of calcium in the mother liquor as tri-phosphate, a precipitation as di-phosphate may be used. The Equation (3) is then substituted by the following equation:

(4)  $3Ca(NO_3)_2 + 6H_3PO_4 + 12NH_3 =$
$3CaHPO_4 + 3(NH_4)_2HPO_4 + 6NH_4NO_3$

The precipitated di-calcium phosphate may be filtered off and returned for treatment with nitric acid together with a fresh portion of phosphate rock. The solution of ammonium phosphate and ammonium nitrate may be worked up just as according to the preceding example.

Previous to the treatment with nitric acid the di-phosphate is advantageously subjected to the action of ammonia according the equation:

(5)  $3CaHPO_4 + 2NH_3 =$
$Ca_3(PO_4)_2 + (NH_4)_2HPO_4$

Tri-calcium phosphate is formed which may be returned to treatment with nitric acid, while simultaneously a solution of ammonium phosphate without any admixture of ammonium nitrate is obtained which may be used for preparation of pure ammonium phosphate.

According to the last named modification of the process the final products are on the one hand crystallized calcium nitrate and on the other hand a mixed product of ammonium phosphate and ammonium nitrate and in addition a separate product of ammonium phosphate.

Instead of treating the di-calcium phosphate with ammonia according to Equation (5), the treatment may be effected by means of ammonium carbonate, or ammonia and carbonic acid according to the following reaction:

(6a)  $3CaHPO_4 + 3(NH_4)_2CO_3 =$
$3CaCO_3 + 3(NH_4)_2HPO_4$ which gives a precipitate consisting of calcium carbonate and di-calcium phosphate. The precipitate is filtered off and is returned to treatment with nitric acid together with fresh phosphate rock. The reaction according to Equation (6a) is not a complete one. The conversion may come to an end when f. inst. some 66 per cent of the di-calcium phosphate is transformed, as illustrated by the following equation:

(6b)  $3CaHPO_4 + 2(NH_4)_2CO_3 =$
$2CaCO_3 + CaHPO_4 + 2(NH_4)_2HPO_4$

*Example 3*

The total content of phosphoric acid in the phosphate may be utilized for the production of ammonium phosphate free from ammonium nitrate, when the crystallization of calcium nitrate from the initial solution of the phosphate material in nitric acid is so conducted that the calcium remaining in the mother liquor is exactly equivalent to the phosphoric acid of the solution for forming dicalcium phosphate.

In this case the crystallization of calcium nitrate as given by Equation (2) above is modified according to the equation:

(7)  $9Ca(NO_3)_2 + 6H_3PO_4 - 3Ca(NO_3)_2 =$
$6Ca(NO_3)_2 + 6H_3PO_4$ and the precipitation of di-phosphate:

(8)  $6Ca(NO_3)_2 + 6H_3PO_4 + 12NH_3 =$
$6CaHPO_4 + 12NH_4NO_3$

The precipitated di-calcium phosphate is filtered from the solution of ammonium nitrate, which is worked up separately. When the di-phosphate is treated in known manner with ammonia or ammonium carbonate the di-phosphate is converted into tri-calcium phosphate, respectively into a mixture of di-calcium phosphate and calcium carbonate and a solution of ammonium phosphate according to the following reactions:

(9a)  $6CaHPO_4 + 4NH_3 =$
$2Ca_3(PO_4)_2 + 2(NH_4)_2HPO_4$ (9b)  $6CaHPO_4 + 4(NH_4)_2CO_3 =$
$4CaCO_3 + 2CaHPO_4 + 4(NH_4)_2HPO_4$

The latter equation indicates the equilibrium of reaction easily obtained.

The solution of ammonium phosphate leaves the process while the tri-calcium phosphate obtained according to (9a) or the mixture of di-phosphate and carbonate according to (9b) is returned to treatment with nitric acid together with a fresh quantity of phosphate rock.

In this modus of carrying out the process the end products, calcium nitrate, ammonium nitrate and ammonium phosphate are obtained separately.

Instead of effecting the precipitation by means of ammonia according to Equation (8) lime, calcium carbonate or alkali carbonates may be used as precipitants. In such case the reaction yields calcium nitrate, respectively alkali nitrates instead of ammonium nitrate.

*Example 4*

A very advantageous modification of the process may be realized in the following manner. The mother liquor from the crystallization of calcium nitrate may be subjected to distillation, by which nitric acid is removed. This modus of carrying out the process, as far as steps subsequent to the crystallization of calcium nitrate are concerned, is illustrated by the following equations:

Distillation of nitric acid:

(10) $3Ca(NO_3)_2 + 6H_3PO_4 = 3Ca(H_2PO_4)_2 + 6HNO_3$

Treatment with ammonia:

(11) $3Ca(H_2PO_4)_2 + 8NH_3 = Ca_3(PO_4)_2 + 4(NH_4)_2HPO_4$ or with ammonia and ammonium carbonate:

(12a) $3Ca(H_2PO_4)_2 + 6NH_3 = 3CaHPO_4 + 3(NH_4)_2HPO_4$ (12b) $3CaHPO_4 + 2(NH_4)_2CO_3 = CaHPO_4 + 2CaCO_3 + 2(NH_4)_2HPO_4$

The reactions (12a) and (12b) may be effected in combination in one and the same apparatus. The tri-calcium phosphate obtained according to (11) or the mixed product of diphosphate and carbonate resulting according to (12a) and (12b) is filtered off and returned for treatment with nitric acid together with a fresh portion of phosphate rock, while the solution of ammonium phosphate is leaving the process.

This last named modification of the process has the merit that ammonium phosphate is obtained immediately and separately without any simultaneous formation of ammonium nitrate. The nitric acid distilled off may be returned to the process and used for dissolving phosphate materials together with fresh nitric acid.

If sufficiently high grade nitric acid is used for dissolving the phosphate material it is not necessary to subject the washed phosphate residue from the treatment with ammonia or ammonium carbonate to drying. It may be used while still moist together with fresh phosphate rock.

The present process involves very important progress as compared with previous proposals for converting calcium phosphates into ammonium phosphates.

The merits of my process may be summarized as follows:

The phosphate rock is first converted into a solution of calcium nitrate and free phosphoric acid, and from this solution a very great part of the calcium nitrate is crystallized out. In this way even 90 per cent of the lime may be removed. The mother liquor which in our process is used for producing ammonium phosphate consequently only contains a minor portion of calcium, and the conversion into ammonium phosphate only gives a rather small quantity of calcium phosphates, to be returned for fresh treatment with acid. This represents a great merit above prior processes, which in a first step only convert the phosphate rock into mono- and di-calcium phosphate, so that a very large quantity of lime has to be circulated in the process. In our process the greater part of lime is not only removed from circulation but it is immediately obtained as valuable crystallized calcium nitrate with a nitrogen content of 11 per cent which only needs slight evaporation and drying in order to yield a commercial fertilizer product with 13–15,5 per cent N. Further our process has great merits, because the conversion of phosphate rock into free phosphoric acid and calcium nitrate, which is a condition for obtaining the calcium nitrate by crystallization according to our process, is far more readily performed than is a conversion of phosphate rock with less quantities of nitric acid into calcium monophosphate as hitherto used. Furthermore our process allows to work in far more concentrated solution than previous processes on account of the small quantities of calcium to be precipitated.

It is also easily seen that according to my process at least one of the stages of reaction necessary in the previous processes of this kind may be dispensed with.

To accelerate the conversion into tri-calcium phosphate or into the phosphatic precipitate to be returned into the process it proves very advantageous to carry out this conversion in a closed apparatus at elevated temperature and under increased pressure and with an excess of reagents such as ammonia or ammonium carbonate. This surplus of reagents may be distilled off from the resulting solution of ammonium phosphate and be reused for subsequent precipitations together with fresh quantities of ammonia or ammonium carbonate.

When cheap hydrochloric acid is available as by-product or waste such acid may be utilized in my process.

The precipitated calcium phosphates may be preliminarily treated with such hydrochloric acid before the precipitate is returned into the process. The hydrochloric acid converts the tri-calcium phosphate into diphosphate which is returned to the process and into a solution of calcium chloride which is removed. The reactions in question are:

(13a) $Ca_3(PO_4)_2 + 2HCl = 2CaHPO_4 + CaCl_2$ (13b) $CaHPO_4 + CaCO_3 + 2HCl = CaHPO_4 + CaCl_2 + CO_2 + H_2O$

By this treatment with hydrochloric acid a corresponding quantity of nitric acid for dissolving the precipitate is saved.

I claim:

1. The process of producing calcium nitrate and ammonium salts from phosphate rock and like phosphate material, comprising treating the phosphate material with nitric acid to form a solution containing calcium nitrate and free phosphoric acid, crystallizing from said solution by cooling a greater part of the lime content of the phosphate material as calcium nitrate, treating the mother liquor so obtained with an ammoniacal precipitant to precipitate calcium phosphates and to form a solution of ammonium salts, separating said solution from the precipitate, returning the latter to the process for fresh treatment with nitric acid and evaporating the solution of ammonium salts to dryness.

2. The process of producing calcium nitrate and ammonium salts from phosphate rock and like phosphate material, comprising treating the phosphate material with nitric acid to form a solution containing calcium nitrate and free phosphoric acid, crystallizing from said solution by cooling a considerable part of the lime content of the phosphate material as calcium nitrate, treating the mother liquor so obtained with ammonia to precipitate calcium phosphates and to form a solution of ammonium salts, separating said solution from the precipitate, returning the latter to the process for fresh treatment with nitric acid and evaporating the solution of ammonium salts to dryness.

3. The process of producing calcium nitrate and ammonium salts from phosphate rock and like phosphate material, comprising treating the phosphate material with nitric acid to form a solution containing calcium nitrate and free phosphoric acid, crystallizing from said solution by cooling a considerable part of the lime content of the phosphate material as calcium nitrate, treating the mother liquor so obtained with ammonium carbonate to precipitate calcium phosphates and to form a solution of ammonium salts, separating said solution from the precipitate, returning the latter to the process for fresh treatment with nitric acid and evaporating the solution of ammonium salts to dryness.

4. The process of producing calcium nitrate and ammonium salts from phosphate rock and like phosphate material, comprising treating the phosphate material with nitric acid to form a solution containing calcium nitrate and free phosphoric acid, crystallizing from said solution by cooling a considerable part of the lime content of the phosphate material as calcium nitrate, treating the mother liquor so obtained with an ammoniacal precipitant to precipitate calcium phosphate and to form a solution of ammonium phosphate and ammonium nitrate, separating said solution from the precipitate, returning the latter to the process for fresh treatment with nitric acid and evaporating the solution of ammonium salts to dryness.

5. The process of producing calcium nitrate and ammonium salts from phosphate rock and like phosphate material, comprising treating the phosphate material with nitric acid to form a solution containing calcium nitrate and free phosphoric acid, crystallizing from said solution by cooling a considerable part of the lime content of the phosphate material as calcium nitrate treating the mother liquor so obtained with an ammoniacal precipitant to precipitate calcium phosphates and to form a solution of ammonium phosphate, separating said solution from the precipitate, returning the latter to the process for fresh treatment with nitric acid and evaporating the solution of ammonium phosphate to dryness.

6. The process of producing calcium nitrate and ammonium salts from phosphate rock and like phosphate material, comprising treating the phosphate material with nitric acid, to form a solution containing calcium nitrate and free phosphoric acid, crystallizing from said solution by cooling a considerable part of the lime content of the phosphate material as calcium nitrate, treating the mother liquor so obtained with an excess of ammoniacal precipitant to precipitate calcium phosphates and to form a solution of ammonium salts, separating said solution from the precipitate, returning the latter to the process for fresh treatment with nitric acid, distilling the excess of ammoniacal precipitant from the ammonium salt solution and evaporating the solution to dryness.

7. The process of producing calcium nitrate and ammonium salts from phosphate rock and like phosphate material, comprising treating the phosphate material with nitric acid to form a solution containing calcium nitrate and free phosphoric acid, crystallizing from said solution a considerable part of the lime content of the phosphate material as calcium nitrate, treating the mother liquor so obtained at elevated temperature and increased pressure with an ammoniacal reagent to precipitate calcium phosphates and to form a solution of ammonium salts, separating said solution from the precipitate, returning the latter to the process for fresh treatment with nitric acid and evaporating solution of ammonium salts to dryness.

8. The process of producing calcium nitrate and ammonium salts from phosphate rock and like phosphate material, comprising treating the phosphate material with nitric acid to form a solution containing calcium nitrate and free phosphoric acid, crystallizing from said solution a considerable part of the lime content of the phosphate material as calcium nitrate, treating the mother liquor so obtained with an ammoniacal reagent to precipitate calcium phosphates and to form a solution of ammonium salts separating the precipitate from the solution, evaporating the solution to dryness, subjecting the phosphatic precipitate to treatment with an ammoniacal reagent to form a solution of ammonium phosphate, separating said solution from the undissolved residue and returning this residue to the process for fresh treatment with nitric acid.

9. The process of producing calcium nitrate and ammonium salts from phosphate rock and like phosphate material, comprising treating the phosphate material with nitric acid to form a solution of calcium nitrate and free phosphoric acid, crystallizing from said solution a considerable part of the lime content of the phosphate material as calcium nitrate, treating the mother liquor so obtained with an ammoniacal reagent to precipitate the entire amount of lime and of phosphoric acid of the mother liquor as calcium phosphates and to form a solution of ammonium nitrate separating the precipitate from the solution, evaporating the solution to dryness, subjecting the phosphatic precipitate to treatment with an ammoniacal reagent to form a solution of ammonium phosphate and returning the residue to fresh treatment with nitric acid.

10. Process of producing calcium nitrate and ammonium salt from phosphate rock and like phosphate material, comprising treating the phosphate material with nitric acid to form a solution containing calcium nitrate and free phosphoric acid, crystallizing from said solution a considerable part of the lime content of the phosphate material as calcium nitrate, subjecting the mother liquor from said calcium nitrate to distillation to remove nitric acid, adding to the remaining liquor an ammoniacal reagent to precipitate calcium phosphate and to form a solution of ammonium phosphate, separating the solution from the precipitate, returning the latter to the process for fresh treatment with nitric acid and evaporating the solution of ammonium phosphate to dryness.

In testimony that I claim the foregoing as my invention I have signed my name.

ERLING JOHNSON.